United States Patent
Ferigo et al.

(10) Patent No.: US 10,781,990 B2
(45) Date of Patent: Sep. 22, 2020

(54) METHOD OF MAKING A VEHICLE LIGHT AND RELATED VEHICLE LIGHT

(71) Applicant: MARELLI AUTOMOTIVE LIGHTING ITALY S.P.A., Turin (IT)

(72) Inventors: Domenico Ferigo, Turin (IT); Sara Paroni, Turin (IT); Davide Sammito, Turin (IT)

(73) Assignee: MARELLI AUTOMOTIVE LIGHTING ITALY S.P.A., Turin (IT)

( * ) Notice: Subject to any disclaimer, the term of this patent is extended or adjusted under 35 U.S.C. 154(b) by 87 days.

(21) Appl. No.: 15/168,573

(22) Filed: May 31, 2016

(65) Prior Publication Data
US 2016/0348866 A1 Dec. 1, 2016

(30) Foreign Application Priority Data

Jun. 1, 2015 (IT) .......................... 102015000019533

(51) Int. Cl.
*F21S 41/29* (2018.01)
*B29C 65/00* (2006.01)
(Continued)

(52) U.S. Cl.
CPC ............ *F21S 41/29* (2018.01); *B29C 65/169* (2013.01); *B29C 65/1635* (2013.01);
(Continued)

(58) Field of Classification Search
CPC ....... F21S 41/29; F21S 43/27; B29C 65/1635; B29C 65/1641; B29C 65/1638
See application file for complete search history.

(56) References Cited

U.S. PATENT DOCUMENTS

| 5,276,303 A | * | 1/1994 | Bergmann | ............. B23K 26/06 219/121.63 |
| 6,054,072 A | * | 4/2000 | Bentley | ............... B29C 65/1412 264/1.9 |

(Continued)

FOREIGN PATENT DOCUMENTS

| CN | 1134605 C | 1/2004 |
| CN | 101818884 A | 9/2010 |

(Continued)

OTHER PUBLICATIONS

Italian Search Report dated Jan. 20, 2016 issued in Italian Patent Application No. UB20150956.
(Continued)

*Primary Examiner* — Bryon T Gyllstrom
*Assistant Examiner* — James M Endo
(74) *Attorney, Agent, or Firm* — Howard & Howard Attorneys PLLC

(57) ABSTRACT

A vehicle light having a container body having a first perimetral profile, a lenticular body, having a second perimetral profile, wherein the first and second perimetral profile of the container body and the lenticular body are at least partially counter-shaped to each other in order to interface at a welding interface of an abutment edge of the lenticular body. The container body delimits a containment seat that houses a light source and the lenticular body is applied to the container body so as to close the containment seat. A redirection surface is adapted to receive laser beams, to concentrate and reflect them towards the welding interface. The redirection surface is arranged on an inner face of the abutment edge, the inner face facing the containment seat and incident with the welding interface. A method of making the vehicle light is also disclosed.

10 Claims, 8 Drawing Sheets

(51) Int. Cl.
  *B29C 65/16* (2006.01)
  *B29L 31/00* (2006.01)
  *F21S 43/27* (2018.01)
(52) U.S. Cl.
  CPC ...... *B29C 65/1667* (2013.01); *B29C 65/1687* (2013.01); *B29C 66/301* (2013.01); *B29C 66/542* (2013.01); *B29C 65/167* (2013.01); *B29C 66/71* (2013.01); *B29L 2031/747* (2013.01); *B60Y 2410/124* (2013.01); *F21S 43/27* (2018.01)

(56) References Cited

U.S. PATENT DOCUMENTS

| | | | | |
|---|---|---|---|---|
| 6,592,239 | B1* | 7/2003 | Akiyama | B29C 65/1638 362/267 |
| 2001/0028567 | A1* | 10/2001 | Akiyama | B29C 66/73361 362/520 |
| 2001/0028568 | A1* | 10/2001 | Akiyama | B29C 66/542 362/520 |
| 2005/0030751 | A1* | 2/2005 | Matsunaga | B29C 65/1635 362/267 |
| 2005/0117362 | A1* | 6/2005 | Yamada | B29C 65/1635 362/509 |
| 2005/0121424 | A1* | 6/2005 | Caldwell | B29C 65/1612 219/121.63 |
| 2007/0188876 | A1* | 8/2007 | Hines | G02B 3/08 359/642 |
| 2008/0199143 | A1* | 8/2008 | Turner | G02B 3/0087 385/146 |
| 2008/0260328 | A1* | 10/2008 | Epstein | G02B 6/0018 385/32 |
| 2010/0202153 | A1 | 8/2010 | Schwab | |
| 2010/0269886 | A1* | 10/2010 | Argentar | G02B 19/0042 136/246 |
| 2011/0094673 | A1 | 4/2011 | Daly et al. | |
| 2011/0203726 | A1* | 8/2011 | Zaitsu | B29C 65/1635 156/272.8 |
| 2011/0317443 | A1* | 12/2011 | Hokoda | B29C 66/116 362/520 |
| 2012/0155106 | A1* | 6/2012 | Kosugi | B29C 65/1635 362/546 |
| 2013/0050966 | A1* | 2/2013 | Frenzel | B29C 66/9292 361/759 |
| 2014/0307433 | A1* | 10/2014 | Kim | F21V 7/04 362/235 |

FOREIGN PATENT DOCUMENTS

| | | |
|---|---|---|
| EP | 2923820 A1 | 9/2015 |
| JP | 2001277364 A | 10/2001 |
| JP | 2002292741 A | 10/2002 |
| JP | 200463332 A | 2/2004 |
| KR | 1020090064000 A | 6/2009 |

OTHER PUBLICATIONS

Communication dated Dec. 8, 2016 enclosing the Extended European Search Report dated Nov. 22, 2016 issued in European Patent Application No. 16172044.

Search Report dated May 29, 2019 issued in Chinese Patent Application No. 2016103836599.

* cited by examiner

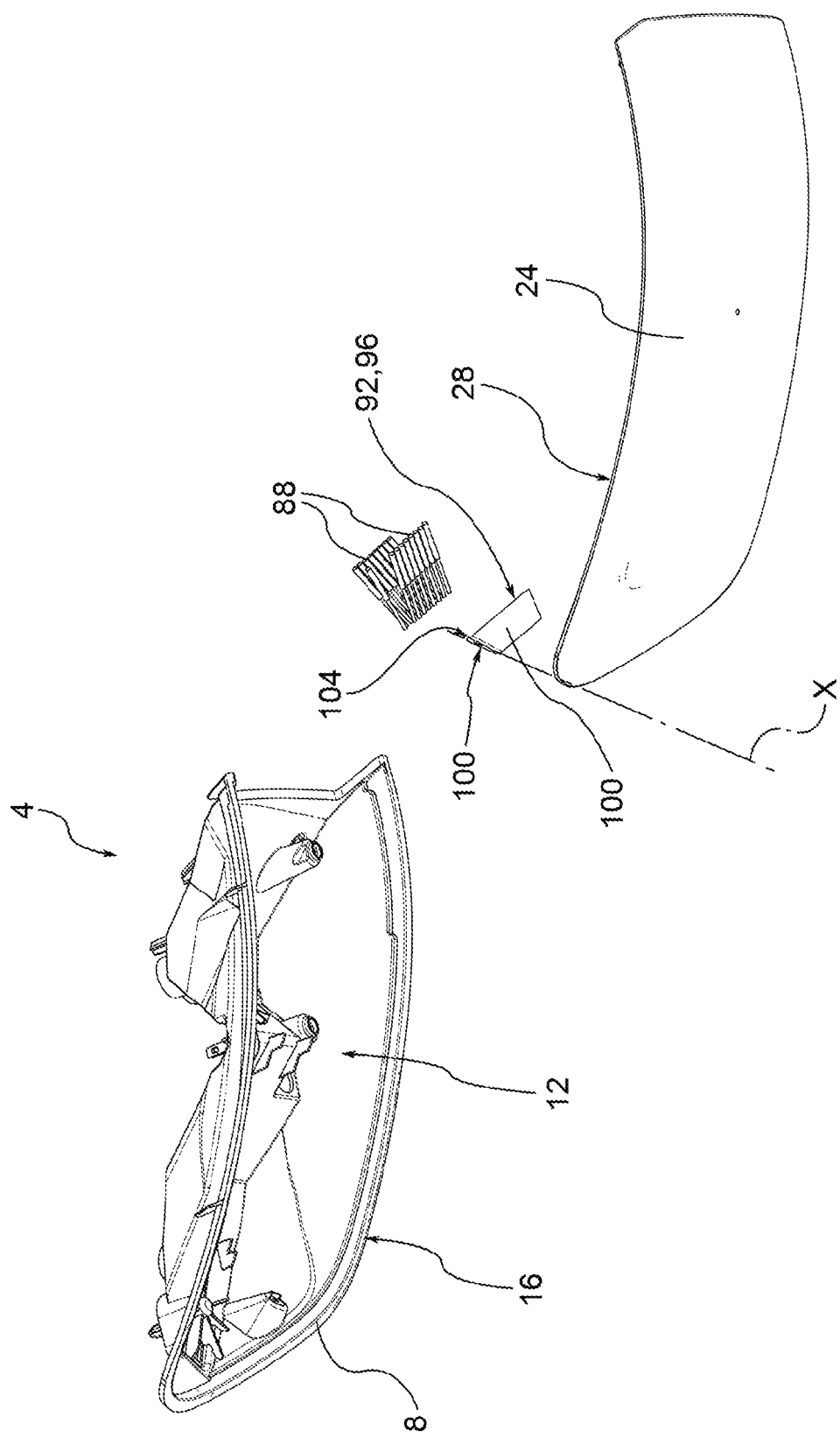

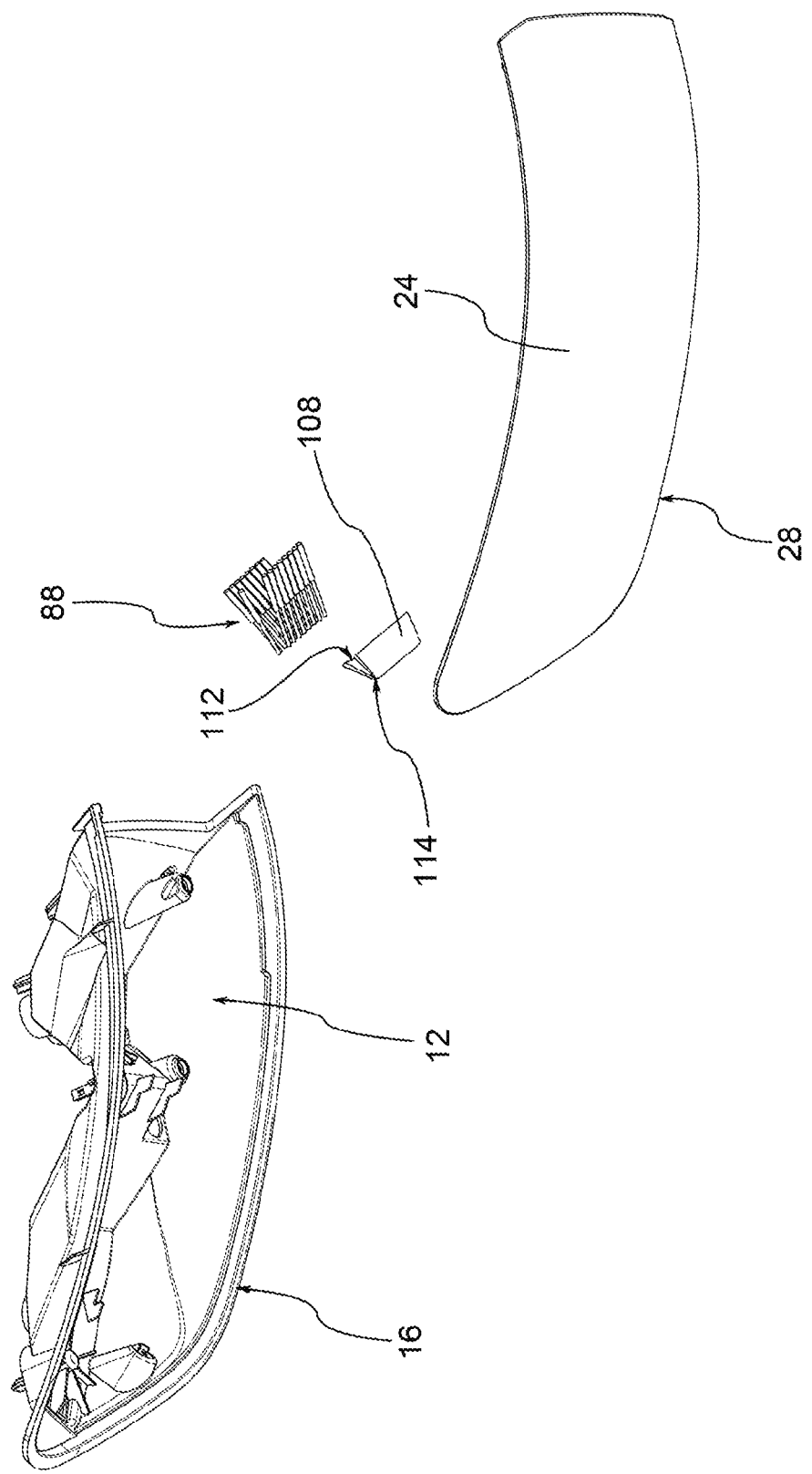

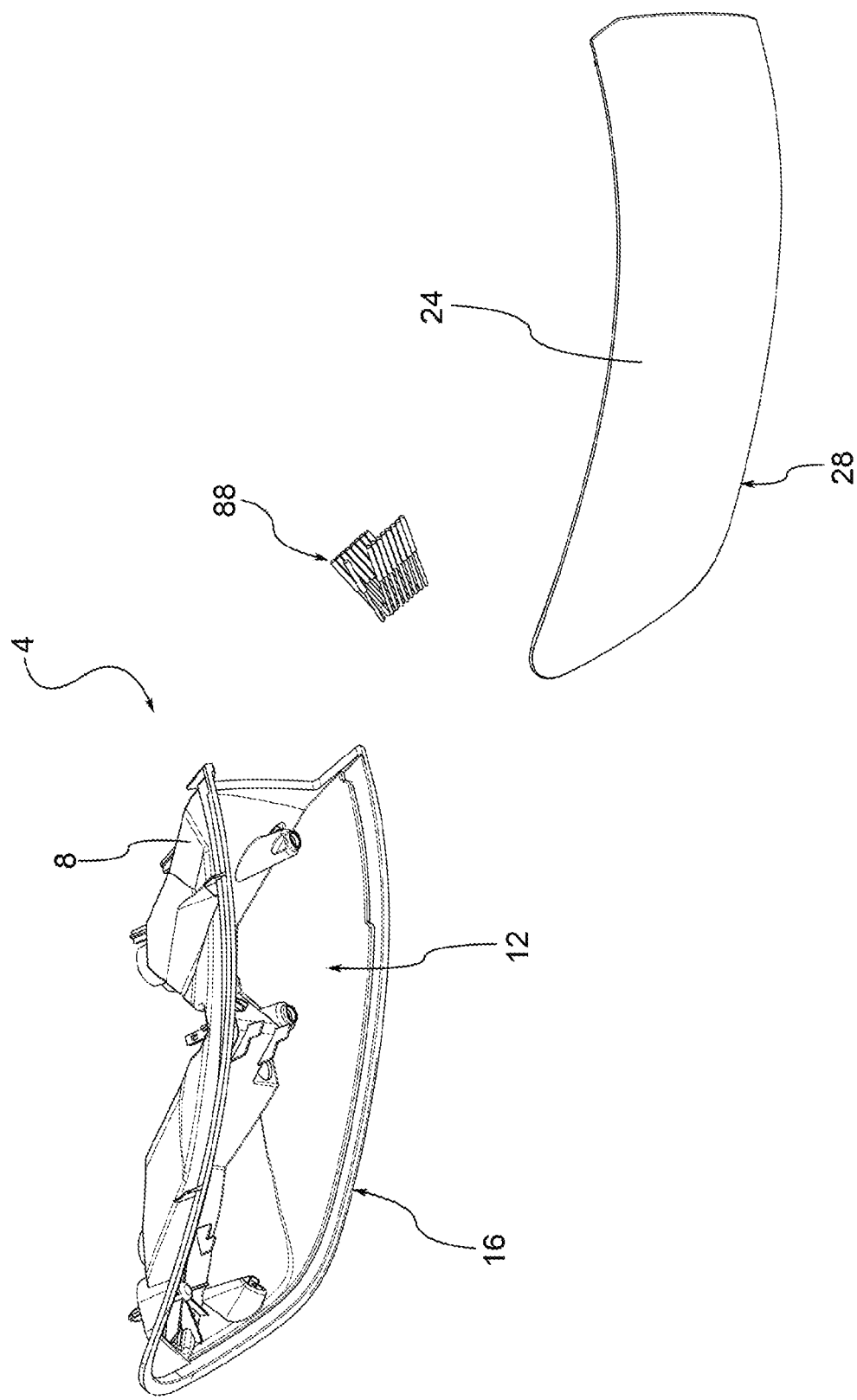

METHOD OF MAKING A VEHICLE LIGHT AND RELATED VEHICLE LIGHT

CROSS-REFERENCE TO RELATED APPLICATIONS

The present claims priority to and all the benefits of Italian Patent Application No. 102015000019533, filed on Jun. 1, 2015, which is hereby expressly incorporated herein by reference in its entirety.

BACKGROUND OF THE INVENTION

1. Field of the Invention

This invention relates to a method of making a vehicle light and related vehicle light obtained with said method.

2. Description of the Related Art

The term vehicle light as used herein refers to both a rear vehicle tail light or a front vehicle headlight, the latter also called projector, or headlamp.

As is known, a vehicle light is a lighting and/or signalling device of a vehicle comprising at least one external light of the vehicle having a function of lighting and/or signalling towards the outside of a vehicle such as, for example, a position light, a turn signal light, a brake light, a rear fog light, a back-up light, a low beam, a high beam and the like.

The vehicle light, in its most simple abstraction, comprises a container body, a lenticular body and at least one light source.

The lenticular body is placed so as to close a mouth of the container body so as to form a housing chamber. Inside the housing chamber is arranged the light source, which can be directed so as to emit light towards the lenticular body, when electrically powered.

The method of making a vehicle light, once the various components are assembled, must provide for the fixing and sealing of the lenticular body on the container body.

This fixing and sealing can be performed by laser welding.

However, the assembly techniques of the known solutions are not free from drawbacks, since the process of laser welding the lenticular bodies on the container body are rather complex, slow and therefore expensive.

In fact, the lenticular bodies and the container bodies of vehicle lights are made of polymeric materials and comprise very complex geometries with curved or rectilinear coupling surfaces having inclinations that are also highly variable along the entire mutual coupling perimeter.

In particular, a low wall or welding interface, as a function of the geometry of the light to be welded, can have sudden changes of inclination with respect to the upper outer surface of the lenticular body, on which a laser beam is incident.

Consequently, in order to reach the welding wall with the laser beam, it may be necessary to significantly incline the incident laser beam with respect to the upper outer surface or front of the lenticular body. This, however, has two implications:
  the highly inclined optical fibres (grazing the surface of the lenticular body) tend to hinder the positioning of other optical fibres, limiting the linear density of placeable fibres, in particular if the welding wall has significant and sudden changes of inclination with respect to the upper outer surface of the lenticular body;
  one will have low energy efficiency (more fibres needed to obtain the same power density on the welding wall) because a significant fraction of the light coming from the source is partially reflected at the interface with the external lens.

A possible solution to this problem would be to make the radiation strike, and position the fibres on, the outer side surface of the lenticular body.

It follows that laser welding techniques are currently little used on automotive vehicle lights, since it would not provide satisfactory results and, in any case, not with competitive costs/times with respect to alternative welding techniques.

SUMMARY OF THE INVENTION

The purpose of this invention is therefore to weld vehicle lights using a laser welding technique by overcoming the technical drawbacks linked to the specificity of vehicle lights that today make such a welding technique inconvenient and expensive.

To this end, the present invention is directed toward a vehicle light comprising a container body delimited by a first perimetral profile, a lenticular body, delimited by a second perimetral profile, wherein the first and second perimetral profile of the container body and of the lenticular body are at least partially counter-shaped to each other so as to interface at a welding interface of an abutment edge of the lenticular body. The welding is a laser-type welding. The container body delimits a containment seat which houses at least one light source and the lenticular body is applied on the container body so as to close the containment seat. The lenticular body, at the abutment edge, includes a redirection surface adapted to receive laser beams emitted by a laser source external to the light and to the containment seat, to reflect them satisfying the condition of total internal reflection and to direct them towards the welding interface. Laser beams impact on an outer side wall of the lenticular body, opposite the containment seat and, after passing through the lenticular body, directly or by at least one reflection, impact on the redirection surface. The redirection surface is arranged on an inner face of the lenticular body, with the inner face facing the containment seat.

In addition, the present invention is also directed toward a method of making a vehicle light. The method includes the steps of: providing a container body delimited by a first perimeter profile, providing a lenticular body delimited by a second perimetral profile, wherein the first and second perimetral profile of the container body and of the lenticular body are at least partially counter-shaped to each other so as to interface at a welding interface of an abutment edge of the lenticular body, associating at least partially with each other the respective first and second perimetral profiles of the container body so as to bring the welding interface into contact with the first perimetral profile. At least partial welding is performed between the lenticular body and the container body in correspondence with the perimetral profiles, through the use of at least a laser source that emits at least one beam or light radiation and directing the laser beam at the welding interface by optical fibres. The container body acts as the absorbent element towards the light beam and the lenticular body acts as a transmissive element of the light beam, wherein it provides that the lenticular body, at the abutment edge, includes a redirection surface adapted to receive laser beams emitted from a laser source external to the light and the containment seat, to reflect them satisfying the condition of total internal reflection and to direct them towards the welding interface. The redirection surface is arranged on an inner face of the lenticular body, with the inner face facing the containment seat, directs the laser beams on an outer side wall of the lenticular body, opposite the containment seat so that, after passing through the lenticular body directly or by at least one reflection, the laser beams impact the redirection surface and are by this reflected onto the welding interface.

Other objects, features and advantages of the present invention will be readily appreciated as the same becomes better understood after reading the subsequent description taken in connection with the accompanying drawings.

BRIEF DESCRIPTION OF THE DRAWINGS

FIG. 4a is a perspective view in separate parts, of a vehicle light according to various embodiments of this invention;

FIG. 4b is a perspective view in separate parts, of a welding tool according to various embodiments of this invention;

FIG. 5 is a perspective view in separate parts of a vehicle light and a welding tool according to a further embodiment of this invention;

The elements, or parts of elements, in common between the embodiments described below will be indicated with the same reference numbers.

DETAILED DESCRIPTION OF THE INVENTION

Figure 1:
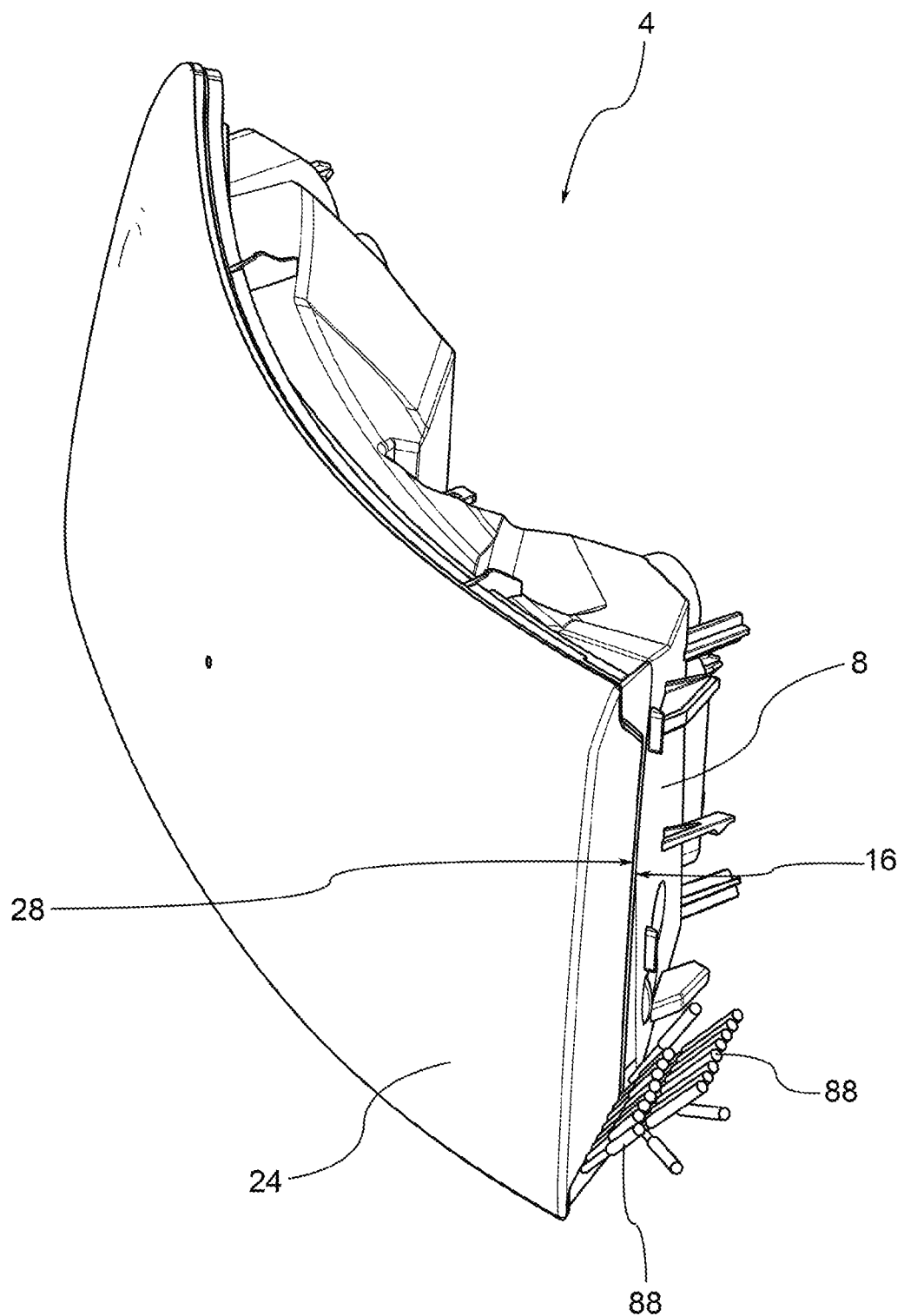
FIG. 1 is a perspective view of a vehicle light according to this invention; during the welding step.
Figure 3:
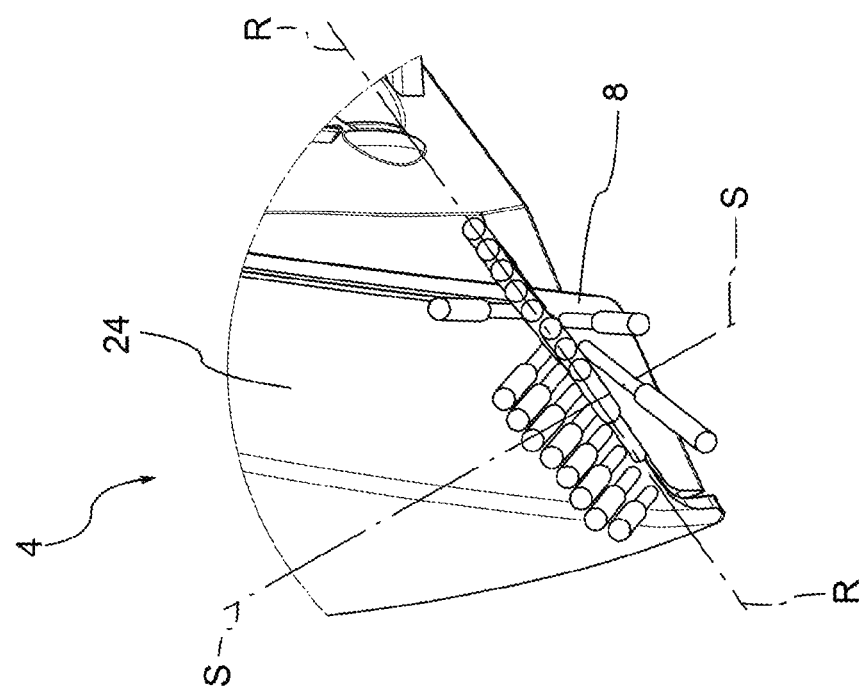
FIG. 3 is an enlarged perspective view of detail III of FIG. 2.
Figure 2:
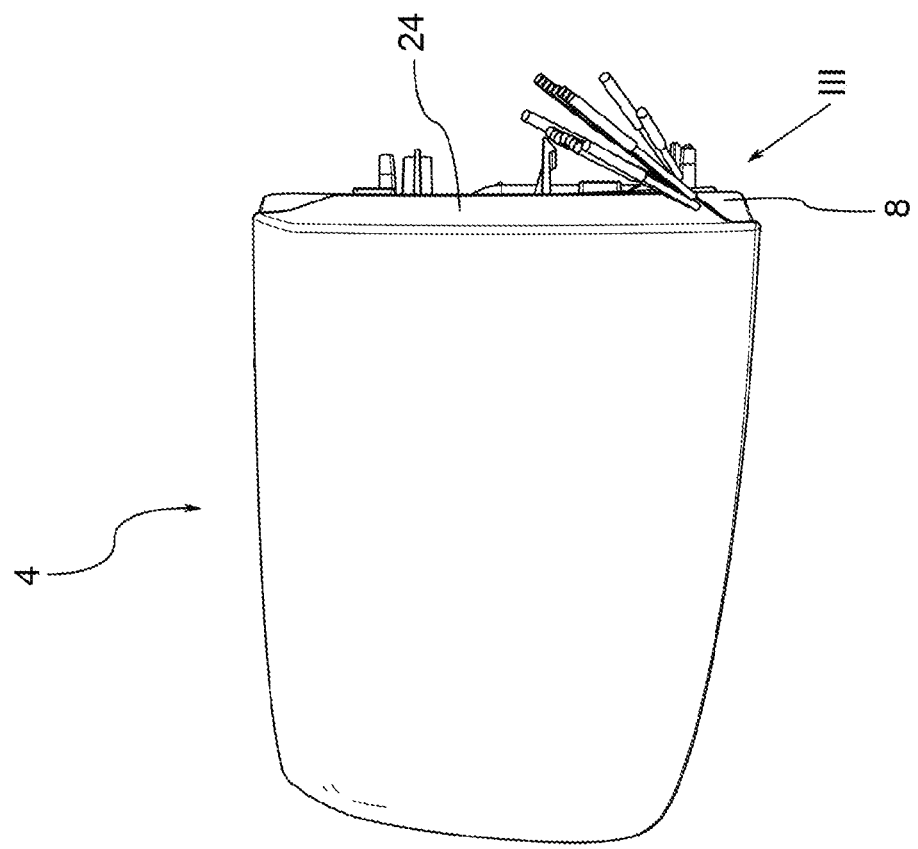
FIG. 2 is a perspective view, from a different angle, of the vehicle light of FIG. 1.
Figure 6:
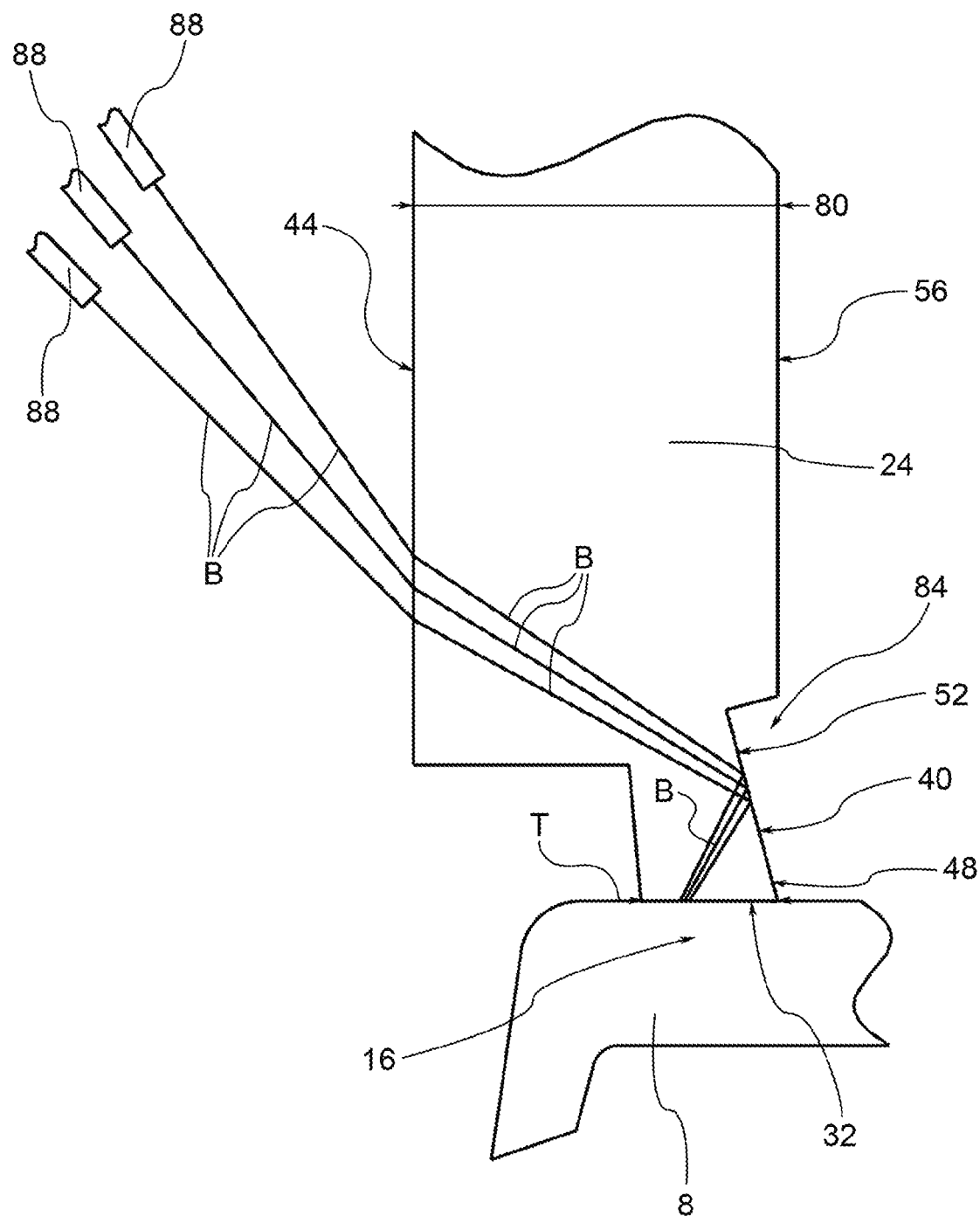
FIG. 6 is a sectional view of details, according to various embodiments, of a vehicle light during welding steps according to this invention.
Figure 7:
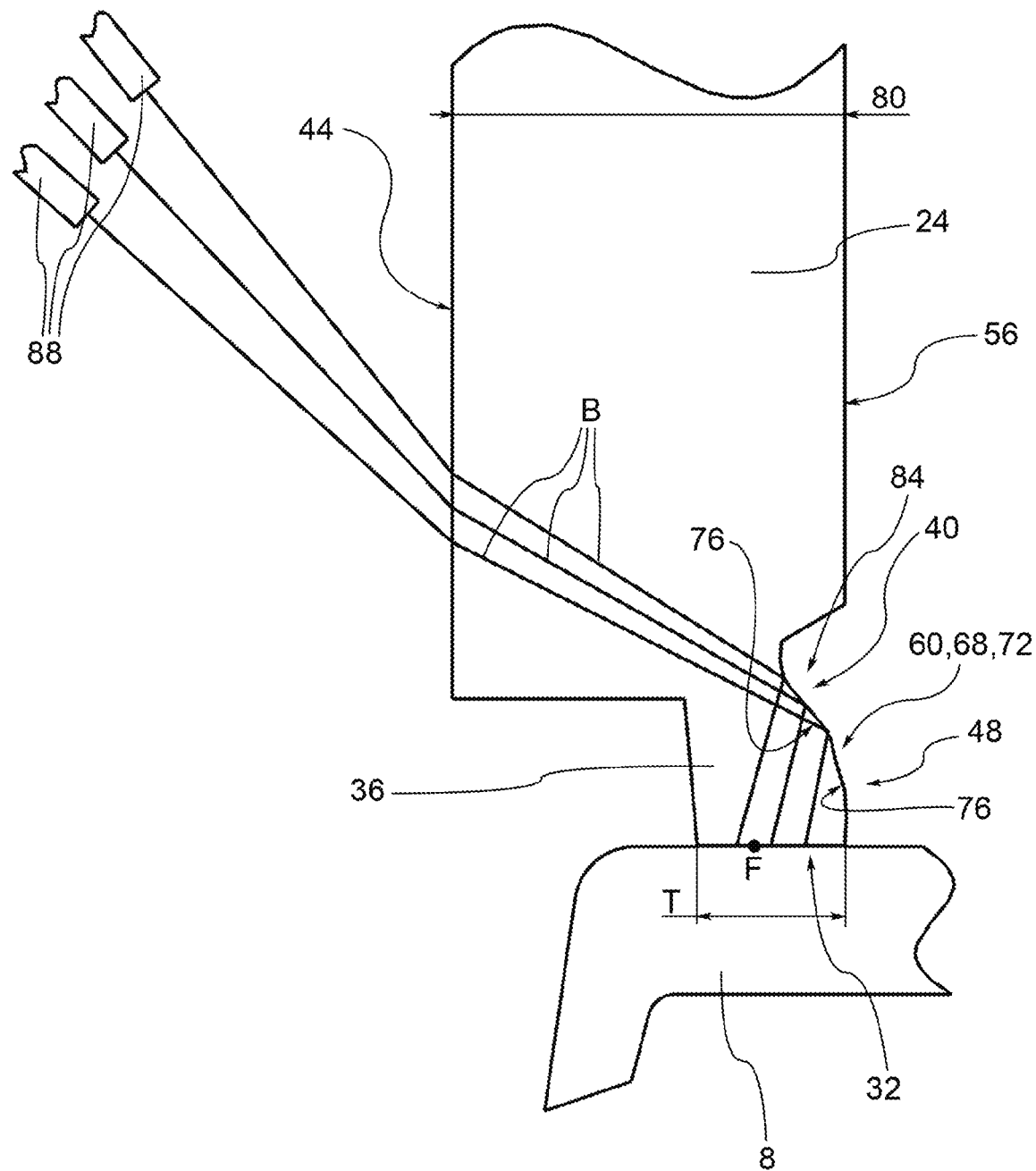
FIG. 7 is a sectional view of details, according to various embodiments, of a vehicle light during welding steps according to this invention.
Figure 8:
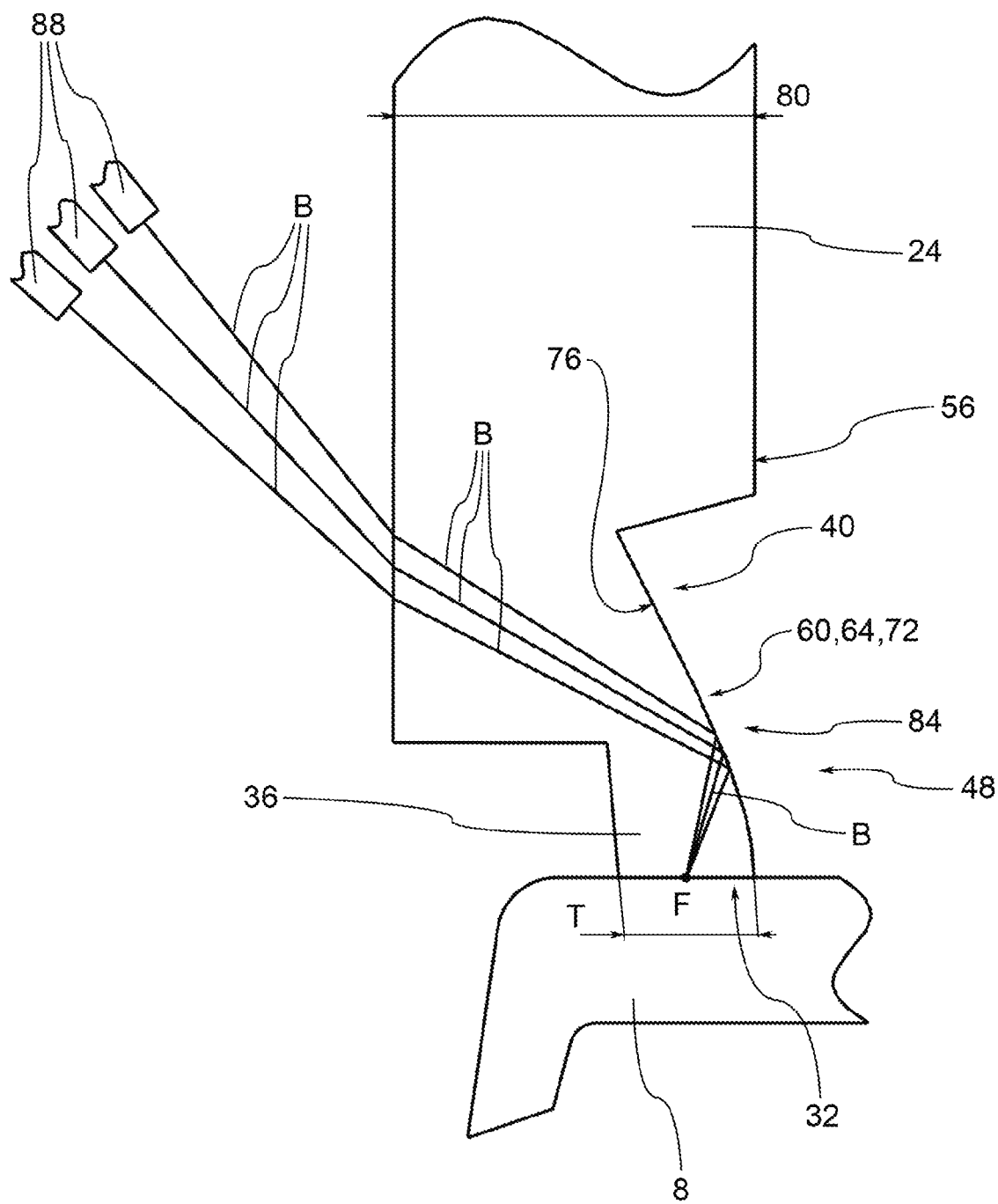
FIG. 8 is a sectional view of details, according to various embodiments, of a vehicle light during welding steps according to this invention.

With reference to the above figures, reference number 4 indicates a vehicle light in its entirety, to which the discussion that follows will refer without, for this reason, losing generality.

As mentioned above, the term vehicle light refers to both a rear vehicle tail light or a front vehicle headlight, the latter also called projector, or headlamp.

As is known, a vehicle light comprises at least one external light of the vehicle having a function of lighting and/or signalling, such as, for example, a position light, which can be a front, rear or side position light, a turn signal light, a brake light, a rear fog light, a low beam, a high beam and the like.

The vehicle light 4 comprises a container body 8, usually made of polymeric material, which typically allows fixing the vehicle light 4 to the related vehicle.

For the purposes of this invention, the container body 8 can have any shape and size, as well as positioning: for example, the container body may not be directly associated to the bodywork or to other hardware of the associable vehicle.

According to an embodiment, the container body 8 delimits a containment seat 12 that houses at least one light source (not shown), electrically connected by to electrical connector for powering it, and suitable to emit a light beam to be propagated outside of the vehicle light. For the purposes of this invention, the type of light source used is irrelevant; preferably, the light source 14 is a light emitting diode (LED) light source.

The container body 8 is delimited by a first perimetral profile 20.

To the container body 8 is associated a lenticular body 24, in its turn delimited by a second perimetral profile 28.

The lenticular body 24 is applied to the container body 8 so as to close said containment seat 12, which houses at least one light source.

For the purposes of this invention, the lenticular body 24 can be outside the vehicle light 4, so as to define at least one outer wall of the vehicle light directly exposed to the atmosphere.

The lenticular body 24 closes the containment seat 12 and is suitable to transmit towards the outside of the vehicle light 4 the light beam produced by the light source 14.

In this regard, the lenticular body 24 is made with material at least partially transparent, semi-transparent or translucent, also being able to include one or more opaque portions, so as, in any case, to allow the at least partial passage of the light beam produced by the light source.

According to possible embodiments, the material of the lenticular body 24 is a resin such as PMMA, PC and the like.

The first and second perimetral profile 20,28 of the container body 8 and of the lenticular body 24 are at least partially counter-shaped to each other so as to interface, in an assembly configuration of the vehicle light 4, at a welding interface 32 of an abutment edge 36 of the lenticular body 24.

As better explained below, following laser welding, the weld bead is formed at the welding interface 32 and there is the partial interpenetration of the abutment edge 36 and/or of the corresponding first perimetral profile 16.

The assembly of the vehicle light 4 comprises the step of associating at least partially with each other the respective first and second perimetral profile 20,28. For example, there is the step of arranging the lenticular body 24 to close the containment seat 12 of the container body 8 so as to associate together the respective first and second perimetral profile 20,28.

Advantageously, the method of making the vehicle light according to this invention provides for associating together the lenticular body and the container body, in correspondence of said perimetral profiles 20,28, by a laser weld.

The laser welding process can be performed with different techniques, for example, with simultaneous laser welding, quasi-simultaneous welding, contour laser welding, mask laser welding, radial laser welding, globe laser welding, etc.

In particular, at least one laser source, not shown, is required, which emits a laser ray, light beam or electromagnetic radiation.

According to possible embodiments, the laser source comprises a CO2 laser, wherein the laser beam is produced by a gas mixture comprising CO2, or a YAG laser, wherein the laser beam is produced by a solid-state crystal, or a laser diode (LD).

In particular, the welding of the lenticular body 24 on the container body 8 is a laser type welding, wherein the light beam emitted by the laser source is directed towards the perimetral profiles 20,28 so as to reach the first perimetral profile 20 of the container body 8 after passing through the lenticular body 24.

During the laser welding step, the container body 8 serves as an absorbent element in relation to the light beam emitted by the laser source and the lenticular body 24 serves as a transmissive element of the same light beam.

For example, the lenticular body 24 is a body made of polymeric material having transmittance values, in the emission spectrum of the laser source, greater than 90%.

Advantageously, the lenticular body (24), at said abutment edge 36, including a redirection surface 40 adapted to receive laser beams emitted by a laser source external to the light 4 and to the containment seat 12, to reflect them satisfying the condition of total internal reflection (TIR) and to direct them towards said welding interface 32.

In particular, the redirection surface 40 are facing the containment seat 12 so as not to be visible from the outside of the vehicle light 4; the laser beams are emitted by a source external to the vehicle light 4 so as to penetrate through the lenticular body 24 and reach the redirection surface 40 arranged internally in the vehicle light 4, namely its containment seat 12.

Said laser beams impact an outer side wall 44 of the lenticular body 24, opposite the containment seat 12 and, after passing through the lenticular body 24, directly or by at least one reflection, impact the redirection surface 40.

According to an embodiment, the redirection surface 40 is, in turn, arranged on an inner face 48 of the abutment edge 36, said inner face 48 facing the containment seat 12 and being incident with the welding interface 32.

In one embodiment variant, the redirection surface 40 is located in the inner side wall 56 of the lenticular body 24.

In other words, the redirection surface 40 is advantageously arranged on the inner side wall 56 of the lenticular body 24; said inner side wall 56 extends to the inner face 48 of the abutment edge 36, which is incident with the welding interface 32.

The redirection surface 40 can therefore be positioned generally on the inner side wall 56 of the lenticular body 24 and also on the inner face 48 of the abutment edge 36.

Redirection surface 40 includes a portion of lenticular body 24 shaped so as to receive laser beams emitted by the external laser source, to reflect them satisfying the condition of total internal reflection (TIR) and to direct them towards said welding interface 32.

According to one embodiment, the redirection surface 40 extends perimetrally in a continuous manner, along the entire abutment edge 36 of the lenticular body 24, on the inner face 48 of said abutment edge 36.

According to one embodiment, said redirection surface 40 comprises a planar wall 52, having at least one rectilinear profile with respect to a cross-section plane S-S perpendicular to the welding interface 32 and perpendicular to a plane R-R tangent to an inner side wall 56 of the lenticular body 24, opposite said outer side wall 44.

For example, said planar wall 52 is inclined so as to identify with the welding interface 32 an acute angle, on the side opposite the containment seat 12.

According to one embodiment, the redirection surface 40 has a section defined by a polyline comprising a plurality of linear walls provided with rectilinear profiles, each straight profile identifying with the welding interface 32 an acute angle, on the side opposite the containment seat 12.

According to one possible embodiment, the redirection surface 40 includes a curvilinear wall 60 having at least one hyperbolic profile 64, with respect to a cross-section plane S-S perpendicular to the welding interface 32 and perpendicular to a plane tangent to an inner side wall 56 of the lenticular body 24, opposite said outer side wall 44, in which a focus F of said hyperbolic profile 64 is positioned in the vicinity of said welding interface 32.

According to a further embodiment, the redirection surface 40 includes a curvilinear wall 60 having at least one parabolic profile 68, with respect to a cross-section plane S-S perpendicular to the welding interface 32 and perpendicular to a plane R-R tangent to an inner side wall 56 of the lenticular body 24, opposite said outer side wall 44, in which a focus F of said hyperbolic profile 68 is positioned in the vicinity of said welding interface 32.

According to an embodiment of this invention, the redirection surface 40 includes a curvilinear wall 60 having at least one curvilinear profile 72, with respect to a cross-section plane S-S perpendicular to the welding interface 32 and perpendicular to a plane tangent to an inner side wall 56 of the lenticular body 24, opposite said outer side wall 44, said curvilinear profile 72 being shaped in such a way as to identify a hyperbolic profile 76 facing towards the incident laser rays, on the opposite side of the containment seat 12.

The abutment edge 36 is positioned in a position recessed with respect to an outer side wall 44 of the lenticular body 24, i.e. on the side of the containment seat 12, in which the outer side wall 44 is opposite the inner side wall 56 of the lenticular body 24 that at least partly defines said containment seat 12. In this way, the abutment edge 36 has a width or thickness T reduced with respect to a thickness 80 of the lenticular body 24, in which the thickness 80 of the lenticular body 24 is given by the distance between the outer side wall 44 and the inner side wall 56. This distance is measured perpendicularly to the respective walls 44,56.

The reduced thickness T of the abutment edge 36 facilitates the concentration of the laser beams and therefore concentrates the heat energy on the welding interface 32 in order to have an effective local melting of the same with the formation of a weld bead.

In one embodiment, the redirection surface 40 of the abutment edge 36 may be defined by a recess 84 formed on said inner side wall 56 of the lenticular body 24. In other words, a recess 84 formed on the inner side wall 56 of the lenticular body 24 is joined to the inner face 48 of the abutment edge 36 so as to create the planar 52 or curvilinear 60 wall of the redirection surface 40.

Now, the method of making a vehicle light according to this invention will be described. In particular, the method of making a vehicle light according to this invention comprises the steps of:

providing a container body 8 delimited by a first perimetral profile 20, providing a lenticular body 24 delimited by a second perimetral profile 28, wherein the first and second perimetral profile 20,28 of the container body 8 and of the lenticular body 24 are at least partially counter-shaped to each other so as to interface at a welding interface 32 of an abutment edge 36 of the lenticular body 24, associating at least partially with each other the respective first and second perimetral profiles 20,28 of the container body 8 and of the lenticular body 24, so as to bring the welding interface into contact with the first perimetral profile 16, performing an at least partial welding between the lenticular body 24 and the container body 8 in correspondence with said perimetral profiles 20,28, through the use of at least one laser source that emits at least one laser beam or light radiation and directing said at least one laser beam towards the welding interface 32 by optical fibres 88, wherein the container body 8 acts as the absorbent element towards the light beam and the lenticular body 24 acts as a transmissive element of the light beam.

In the figures, the light beams emitted by the fibres are shown with the arrows B, so as to also schematically represent the reflections that these beams undergo inside the lenticular body 24 before impacting on the abutment edge 36 and on the welding interface 32.

Advantageously the method comprises the steps of:
providing that the lenticular body 24, at said abutment edge 36, includes a redirection surface 40 adapted to receive laser beams emitted by a laser source external to the light 4 and the containment seat 12, to reflect them satisfying the condition of total internal reflection (TIR) and to direct them towards said welding interface 32, wherein the redirection surface 40 is arranged on an inner face 48 of the abutment edge 36, said inner face 48 facing the containment seat 12 and being incident with the welding interface 32,
directing said laser beams on an outer side wall 44 of the lenticular body 24, opposite the containment seat 12 so that, after passing through the lenticular body 24 directly or by at least one reflection, the laser beams impact the redirection surface 40 and are reflected by them onto the welding interface 32.

In other words, the redirection surface 40 is facing the containment seat 12 so as not to be visible from the outside of the vehicle light 4; the laser beams are emitted by a source external to the vehicle light 4 so as to penetrate through the lenticular body 24 and reach the redirection surface 40 arranged internally in the vehicle light 4, namely its containment seat 12.

According to an embodiment, the step of directing the laser beams on the outer side wall 44 of the lenticular body 24 comprises the step of positioning the optical fibres 88 from a side of the outer side wall 44 of the lenticular body 24 so that the laser beams impact, directly or by at least one reflection, on the redirection surface 40 of the lenticular body 24 and, via the latter, impact the welding interface 32.

In this way, the optical fibres 88 can be placed in an appropriate way in the space, also according to orientations different from each other, without physically interfering with each other, since the redirection surface 40 of the lenticular body 24 allow suitably directing the rays coming from the optical fibres on the welding interface 32. Different orientations means that the optical fibres 88 can be parallel and/or skewed.

Note that the laser rays emitted can be either convergent, parallel or skewed with each other.

According to a possible embodiment, the method of making a vehicle light according to this invention comprises the step of providing at least one collimator device 92 between the optical fibres 88 and the lenticular body 24, so as to collimate along a predetermined optical axis X-X, the light beams coming from the optical fibres 88 and directing appropriately on the lenticular body 24 the light beams coming from the optical fibres 88, so that said light beams impact, directly or through at least one reflection, the redirection surface 40 facing the container body 8 on the side of the inner side wall 56 of the lenticular body 24.

According to an embodiment, the collimator device 92 comprises a negative light guide 96, i.e. a light guide formed of reflective walls 100 inclined with respect to the optical axis X-X of the optical fibre 88, and in which the optical fibre 104 is positioned in the vicinity of an upper opening 104 of the negative light guide 96 and along the optical axis X-X.

According to a further possible embodiment, the collimator device 92 comprises a positive light guide 108, i.e. a solid body suitable for satisfying the condition of total internal reflection for the at least one portion of incident laser beam, in which the solid body extends from an inlet 112 to an outlet 114, wherein the inlet 112 is facing said optical fibres 88 and the outlet 114 is facing said lenticular body 24, wherein the solid body is composed of a material transparent to the emission wavelength of the laser beam.

As mentioned above, the laser welding techniques for the implementation method according to this invention can be of various types; for example, the laser welding step takes place by one or more optical fibres 88 that emit respective light radiations simultaneously to each other on different predetermined portions of said perimetral profiles 20,28, according to a "simultaneous" welding technique.

It is also possible, for example, to perform the laser welding step with at least one laser source, with the related moving fibre optics 32, which is guided so as to direct the light radiation along said perimetral profiles 20,28, according to a "contour" welding technique.

As can be appreciated from the description, this invention allows overcoming the drawbacks presented in the prior art.

In particular, it is also possible to apply the laser welding technique to vehicle lights having any type of complex geometry and having curvatures and thicknesses that vary sharply along the perimeter of the light.

In particular, thanks to the presence of the redirection surface on the inner side of the lenticular body it is possible to suitably direct the light beams emitted by the optical fibres in such a way as to obtain the thermal power required to make a mechanically strong and durable welding joint.

Thanks to the presence of the redirection surface on the inside, and therefore not visible, of the lenticular body, the end user cannot see these redirection surfaces from the outside and, therefore, the aesthetics of the vehicle light are not altered in any way.

Furthermore, the light beam that strikes the interface is thus adequate to obtain a welding joint with excellent mechanical qualities, without wasting light power.

Moreover, the laser welding step, performed with any technique, for example, "contour" or "simultaneous", is fast and reliable, allowing a further reduction of assembly costs with equal joint quality with respect to the known techniques.

Moreover, thanks to the positioning of the optical fibres laterally with respect to the lenticular body, it is possible to reduce the length of the path that the laser beams must follow to reach the interface between the two perimetral profiles to be welded and thus increase efficiency.

Note that, along this path, the light beam is at least partially absorbed by the lenticular body and therefore, in order to locally melt the container body (absorbent) in correspondence of the interface surface, it is necessary to send a high-power light beam. In this way, consumption would be increased, on the one hand, and there is a risk of unwanted melting or softening in different parts of the lenticular body, on the other.

Thanks to this invention and to the lateral positioning of the optical fibres, it is possible to reduce the path that the light beams must follow before striking the interface: so, the energy powers to be emitted are reduced and thus welding costs; in addition, the above-mentioned risks of softening due to an excess power of the laser beam are avoided.

Furthermore, it is possible to reduce the size, i.e., the thicknesses of the abutment wall and therefore the welding interface, since the internal redirection surfaces of the lenticular body are able to concentrate the beams in an area that is also narrow. In this way, the powers of the emitted laser can be reduced and concentrated, while still achieving a mechanically strong welding joint.

Moreover, the optical fibres can be positioned in space without physically interfering with each other.

A person skilled in the art, in order to satisfy contingent and specific needs, may make numerous modifications and variations to the vehicle light and methods of making vehicle lights described above, all however contained within the scope of the invention as defined by the following claims.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A vehicle light comprising
a container body delimited by a first perimetral profile,
a lenticular body having an outer side wall, an inner side wall, and an abutment edge, delimited by a second perimetral profile,
wherein the first and second perimetral profile of the container body and of the lenticular body are at least partially counter-shaped to each other so as to interface at a welding interface of the abutment edge of the lenticular body,
said welding being a laser-type welding,
wherein the container body delimits a containment seat which houses at least one light source and the lenticular body is applied on the container body so as to close said containment seat,
wherein the abutment edge is offset from the outer side wall, and the abutment edge is offset from the inner side wall by a recess facing the containment seat such that the abutment edge is between the outer and inner side wall,
wherein said abutment edge of the lenticular body includes a redirection surface, the redirection surface is a planar wall formed by the recess such that the redirection surface forms an acute angle with respect to the welding interface,
the redirection surface adapted to receive laser beams emitted by a laser source external to the at least one light source and to the containment seat, to reflect the laser beams satisfying the condition of total internal reflection and to direct the laser beams towards said welding interface,
said laser beams impacting on the outer side wall of the lenticular body, opposite the containment seat and, after passing through the lenticular body, directly or by at least one reflection, impacting on said redirection surface, wherein the lenticular body and the container body are welded together at the welding interface.

2. The vehicle light as set forth in claim 1, wherein the redirection surface is arranged on an inner face of the abutment edge, said inner face facing the containment seat and incident with the welding interface.

3. The vehicle light as set forth in claim 1, wherein the redirection surface is facing the containment seat so as not to be visible from the outside of the vehicle light.

4. The vehicle light as set forth in claim 1, wherein the redirection surface extends perimetrally in a continuous manner, along the entire abutment edge of the lenticular body, on the inner face of said abutment edge.

5. The vehicle light as set forth in claim 1, in which said redirection surface includes a planar wall, having at least one rectilinear profile with respect to a cross-section plane perpendicular to the welding interface and perpendicular to a plane tangent to an inner side wall of the lenticular body, opposite said outer side wall.

6. The vehicle light as set forth in claim 5, wherein said planar wall is inclined so as to identify with the welding interface an acute angle, on the side opposite the containment seat, suitable to satisfy the condition of total internal reflection.

7. The vehicle light as set forth in claim 5, wherein the redirection surface has a section defined by a polyline comprising a plurality of planar walls provided with rectilinear profiles, each straight profile identifying with the welding interface an acute angle, on the side opposite the containment seat.

8. The vehicle light as set forth in claim 1, wherein the abutment edge is positioned in a position recessed with respect to an outer side wall of the lenticular body, i.e. on the side of the containment seat, the outer side wall being opposite an inner side wall of the lenticular body which at least partly defines said containment seat.

9. A vehicle light comprising
a container body delimited by a first perimetral profile,
a lenticular body having an outer side wall, an inner side wall, and an abutment edge, delimited by a second perimetral profile,
wherein the first and second perimetral profile of the container body and of the lenticular body are at least partially counter-shaped to each other so as to interface at a welding interface of the abutment edge of the lenticular body,
said welding being a laser-type welding,
wherein the container body delimits a containment seat which houses at least one light source and the lenticular body is applied on the container body so as to close said containment seat,
wherein the abutment edge is offset from the outer side wall, and the abutment edge is offset from the inner side wall by a recess facing the containment seat such that the abutment edge is between the outer and inner side wall,
wherein said abutment edge of the lenticular body includes a redirection surface, wherein the redirection surface includes a curvilinear wall having at least one parabolic profile with respect to a cross-section plane perpendicular to the welding interface and perpendicular to a plane tangent to an inner side wall of the lenticular body, opposite said outer side wall, in which a focus of said parabolic profile is positioned in the vicinity of said welding interface,
the redirection surface adapted to receive laser beams emitted by a laser source external to the at least one light source and to the containment seat, to reflect the laser beams satisfying the condition of total internal reflection and to direct the laser beams towards said welding interface,
said laser beams impacting on the outer side wall of the lenticular body, opposite the containment seat and, after passing through the lenticular body, directly or by at least one reflection, impacting on said redirection surface, wherein the lenticular body and the container body are welded together at the welding interface.

10. A vehicle light comprising a container body delimited by a first perimetral profile, a lenticular body having an outer side wall, an inner side wall, and an abutment edge, delimited by a second perimetral profile, wherein the first and second perimetral profile of the container body and of the lenticular body are at least partially counter-shaped to each other so as to interface at a welding interface of the abutment edge of the lenticular body, said welding being a laser-type welding, wherein the container body delimits a containment seat which houses at least one light source and the lenticular body is applied on the container body so as to close said containment seat, wherein the abutment edge is offset from the outer side wall, and the abutment edge is offset from the inner side wall by a recess facing the containment seat such that the abutment edge is between the outer and inner side wall, wherein said abutment edge of the lenticular body includes a redirection surface, wherein the redirection surface includes a curvilinear wall having at least one curvilinear profile with respect to a cross-section plane perpendicular to the welding interface and perpendicular to a plane tangent to an inner side wall of the lenticular body, opposite said outer side wall, in which a focus of said curvilinear profile is positioned in the vicinity of said welding interface, the redirection surface adapted to receive laser beams emitted by a laser source external to the at least one light source and to the containment seat, to reflect the laser beams satisfying the condition of total internal reflection and to direct the laser beams towards said welding interface, said laser beams impacting on the outer side wall of the lenticular body, opposite the containment seat and, after passing through the lenticular body, directly or by at least one reflection, impacting on said redirection surface, wherein the lenticular body and the container body are welded together at the welding interface.

* * * * *